United States Patent
Shimamoto et al.

(10) Patent No.: US 7,258,911 B2
(45) Date of Patent: Aug. 21, 2007

(54) ACRYLIC MATT THERMOPLASTIC RESIN FILMS AND PROCESS FOR PRODUCING THE SAME

(75) Inventors: Yukihiro Shimamoto, Settsu (JP); Juichi Nishimura, Takatsuki (JP)

(73) Assignee: Kaneka Corporation, Osaka (JP)

( * ) Notice: Subject to any disclaimer, the term of this patent is extended or adjusted under 35 U.S.C. 154(b) by 403 days.

(21) Appl. No.: 10/469,470

(22) PCT Filed: Feb. 26, 2002

(86) PCT No.: PCT/JP02/01696

§ 371 (c)(1),
(2), (4) Date: Aug. 27, 2003

(87) PCT Pub. No.: WO02/068175

PCT Pub. Date: Sep. 6, 2002

(65) Prior Publication Data

US 2004/0081838 A1 Apr. 29, 2004

(30) Foreign Application Priority Data

Feb. 28, 2001 (JP) ............................. 2001-55432

(51) Int. Cl.
*B32B 7/02* (2006.01)
*B32B 27/00* (2006.01)

(52) U.S. Cl. ...................... 428/212; 428/332; 428/340; 428/480; 428/482

(58) Field of Classification Search ................ 428/332, 428/480, 482, 147, 212, 340
See application file for complete search history.

(56) References Cited

U.S. PATENT DOCUMENTS 4,707,396 A * 11/1987 Wank et al. ................ 428/216
5,076,987 A 12/1991 Wank et al.
6,861,121 B2 * 3/2005 Matsunaga et al. ......... 428/141

FOREIGN PATENT DOCUMENTS

| EP | 0 484 797 | 5/1992 |
| JP | 55-014262 | 1/1980 |
| JP | 09-263614 | 10/1997 |
| JP | 10-000676 | 1/1998 |
| JP | 11-335511 | 12/1999 |
| JP | 2001-055432 | * 2/2001 |
| WO | 99/29766 | 6/1999 |
| WO | 01/62843 | 8/2001 |

* cited by examiner

*Primary Examiner*—Rena Dye
*Assistant Examiner*—Lawrence D. Ferguson
(74) *Attorney, Agent, or Firm*—Hogan & Hartson LLP

(57) ABSTRACT

Acrylic matt thermoplastic resin films having excellent printability, flex whitening resistance, impact resistance and solvent resistance, and a process for the preparation thereof are provided. The films made of a thermoplastic resin composition comprising 100 parts by weight of an acrylic resin (A) and 0.5 to 20 parts by weight of a crosslinked acrylic polymer (B) as a matting agent are prepared by a process wherein the resin composition is kneaded and formed into a film, and the both surfaces of the film are simultaneously brought into contact with rolls between them, one roll being kept at a temperature of not less than the glass transition temperature Tg of the resin composition and the other roll being kept at a temperature of less than the Tg, whereby the film surface contacted with the roll having a temperature of Tg or higher is converted into a mirror surface and the film surface contacted with the roll having a temperature lower than Tg is converted into a matt surface.

16 Claims, No Drawings

ACRYLIC MATT THERMOPLASTIC RESIN FILMS AND PROCESS FOR PRODUCING THE SAME

TECHNICAL FIELD

The present invention relates to a matt thermoplastic resin film suitable for printing. More particularly, the invention relates to a matt acrylic thermoplastic resin film which has an excellent printability and can be thermally processed without impairing low glossiness, and a process for producing the matt film.

BACKGROUND ART

Moldings of thermoplastic resins such as acrylic resin generally have gloss (luster), and the gloss is an important property for some uses. On the other hand, there are also many uses that do not require gloss or prefer to be not glossy. In particular, matt moldings are preferred for uses such as interior materials for vehicles, furniture, housing of electric equipment, wallpapers and building materials.

Conventional processes for matting thermoplastic resins are roughly classified into (1) a process by embossing or by mechanical or chemical matting processing, and (2) a process by addition of an inorganic or organic matting agent.

The process (1) has the advantage that in general decrease in physical properties is small, but has the problems that in addition to low productivity and increase in processing cost, the matting effect is not sufficient and, in many cases, gloss is restored if films are heated in secondary processing, thus the matting effect is lost. On the other hand, the process (2) has the advantages that the productivity does not decrease so much, it is easy to control the matting degree and the products are also applicable to uses wherein the products are subjected to secondary processing, but has a large problem of decrease in physical properties. In particular, in case of using an inorganic material such as silica gel as a matting agent, decrease in physical properties such as impact resistance, tensile strength, elongation and transparency is marked.

Also, in case of making a print on the surface of acrylic resin films, the process (2) has the problem that printing defect may occur due to protrusions (hereinafter referred to as "fish eye") on the surface resulting from foreign matter. With regard to transparent films, it is known for solving the printing defect problem to bring the both surfaces of a film to contact with rolls kept at a temperature higher than Tg of the film. However, this method has the problem for matt films that the matt surface gets back to gloss surface. In JP-A-03-237134 is proposed a method by incorporation of an organic matting agent, but in case of making a print onto films, this method has the problems that since unevenness of the film surface is large, ink is hard to transfer onto concave portions, so no sharp printed pattern is obtained, or printing defect takes place at protrusions on the film surface.

It is an object of the present invention to solve the above-mentioned problems and to provide a matt acrylic thermoplastic resin film, without impairing physical properties such as matting property, impact resistance, heat resistance, tensile strength and elongation, which is improved so as to prevent the printing defect from occurring as much as possible by decreasing protrusions on the film surface, and is improved, besides improvement in ink receptivity, so as to maintain a low glossiness of one surface, and further which is hard to get back to gloss surface even if subjected to secondary processing.

DISCLOSURE OF INVENTION

The present inventors have found that an acrylic matt film having an excellent printability and secondarily processable without impairing the matting effect can be obtained by, when forming a film from a thermoplastic resin composition wherein a crosslinked acrylic polymer is incorporated as a matting agent into an acrylic resin, bringing one surface of the film into contact with a roll kept at a temperature of not less than the glass transition temperature (Tg) of the thermoplastic resin composition and simultaneously bringing the other surface of the film into contact with a roll kept at a temperature of less than the Tg, thereby converting the one surface into a mirror surface and converting the other surface into a matt surface, while the temperature of the film is not less than the Tg of the thermoplastic resin composition.

Thus, the present invention provides a process for producing an acrylic matt thermoplastic resin film comprising kneading a thermoplastic resin composition comprising (A) 100 parts by weight of an acrylic resin and (B) 0.5 to 20 parts by weight of a crosslinked acrylic polymer as a matting agent, forming the composition into a film, and bringing the both surfaces of the film into contact with rolls simultaneously between the rolls, wherein one surface of the film is brought into contact with a roll kept at a temperature of not less than the glass transition temperature (Tg) of the resin composition (I) to thereby provide the surface of the film with a mirror surface and the other surface of the film is brought into contact with a roll kept at a temperature of less than the Tg to thereby provide the other surface with a matt surface.

The films of the present invention can maintain a desirable low gloss even if subjected to secondary processing, since the increase in 60° reflectivity (%) of the matt surface by heating at 200° C. for 1 minute is 10% or less.

The present invention also provides an acrylic matt thermoplastic resin film having a mirror surface on one surface and a matt surface on the other surface.

The thickness of the films of the present invention is usually from 10 to 300 μm.

It is preferable that the crosslinked acrylic polymer (B) used for matting has a weight average particle size of 0.5 to 15 μm.

As acrylic resin (A) is preferably used an acrylic graft copolymer comprising (a-1) 5 to 85 parts by weight of at least one layer of an elastomeric polymer of 50 to 99.9% by weight of an alkyl acrylate, 0 to 49.9% by weight of other copolymerizable vinyl monomer and 0.1 to 10% by weight of a copolymerizable polyfunctional monomer having at least two non-conjugated double bonds per a molecule, and (a-2) 95 to 15 parts by weight of at least one layer of a graft component composed of 50 to 100% by weight of an alkyl methacrylate and 0 to 50% by weight of other vinyl monomer copolymerizable therewith which have been graft-copolymerized onto the elastomeric polymer (a-1). It is preferable that the particle size of the elastomeric polymer (a-1) is from 50 to 400 nm.

As crosslinked acrylic polymer (B) used for matting is preferably used a non-graft or graft copolymer comprising (b-1) 40 to 100 parts by weight of at least one layer of a crosslinked acrylic ester polymer prepared by polymerizing 100 to 90% by weight of an acrylic monomer composed of 40 to 90% by weight of an alkyl acrylate and 60 to 10% by weight of an alkyl methacrylate with 0 to 10% by weight of at least one other copolymerizable vinyl monomer and 0.1 to 20 parts by weight of a copolymerizable polyfunctional monomer having at least two non-conjugated double bonds per a molecule based on 100 parts by weight of the total of the acrylic monomer and other vinyl monomer, and (b-2) 60 to 0 part by weight of at least one layer of a graft component composed of 60 to 100% by weight of an alkyl methacrylate, 0 to 40% by weight of an alkyl acrylate and 0 to 10% by weight of other copolymerizable vinyl monomer which have been graft-copolymerized onto the crosslinked acrylic ester polymer (b-1).

BEST MODE FOR CARRYING OUT THE INVENTION

The thermoplastic resin composition (I) used for the preparation of the films of the present invention comprises the acrylic resin (A) and 0.5 to 20 parts by weight of the crosslinked acrylic polymer (B) for matting per 100 parts by weight of the acrylic resin (A).

In the present invention, as the acrylic resin (A) is used an acrylic graft copolymer obtained by polymerizing a vinyl monomer, especially a vinyl monomer containing a predominant amount of an alkyl methacrylate, in the presence of an acrylic elastomer, especially a crosslinked alkyl acrylate elastomeric homopolymer or copolymer.

Preferably, the acrylic resin (A) is an acrylic graft copolymer obtained by polymerizing (a-2) 95 to 15 parts by weight of a graft component composed of 50 to 100% by weight of an alkyl methacrylate and 0 to 50% by weight of other vinyl monomer copolymerizable therewith in the presence of (a-1) 5 to 85 parts by weight of an elastomeric polymer composed of 50 to 99.9% by weight of an alkyl acrylate, 0 to 49.9% by weight of other copolymerizable vinyl monomer and 0.1 to 10% by weight of a copolymerizable polyfunctional monomer having at least two non-conjugated double bonds per a molecule (the total of the elastomeric polymer (a-1) and the graft component (a-2) being 100 parts by weight). The elastomeric polymer (a-1) may have a single layer structure or a multi-layer structure. It is preferable that the average particle size of the elastomeric polymer (a-1) is from 50 to 400 nm.

The alkyl acrylates used in the elastomeric polymer (a-1) are preferably those having a $C_1$ to $C_8$ alkyl group, e.g., methyl acrylate, ethyl acrylate, propyl acrylate, butyl acrylate, 2-ethylhexyl acrylate, n-octyl acrylate, and the like. These may be used alone or in admixture thereof. The alkyl group of the alkyl acrylate may be linear or may be branched, but if the number of carbon atoms thereof is more than 8, the reaction rate becomes slow. The content of the alkyl acryalte in the elastomeric polymer (a-1) is from 50 to 99.9% by weight, preferably 60 to 99% by weight, more preferably 70 to 95% by weight. If the content of the alkyl acrylate is less than 50% by weight, the impact resistance lowers, and if the content is more than 99.9% by weight, the transparency of films lowers.

The polyfunctional monomer having at least two non-conjugated double bonds per a molecule used in the elastomeric polymer (a-1) is a component used as a crosslinking agent or a graftlinking agent. Examples thereof are, for instance, a dialkylene glycol dimethacrylate such as ethylene glycol dimethacrylate, diethylene glycol dimethacrylate, dipropylene glycol dimethacrylate or dibutylene glycol dimethacrylate, a dialkylene glycol diacrylate such as those exemplified for the dialkylene glycol dimethacrylate wherein the dimethacrylate is replaced with diacrylate, a vinyl group-containing polyfunctional monomer such as divinyl benzene or divinyl adipate, an allyl group-containing polyfunctional monomer such as diallyl phthalate, diallyl maleate, allyl acrylate, allyl methacrylate, triallyl cyanurate or triallyl isocyanurate, and the like. These may be used alone or in admixture thereof. The content of the polyfunctional monomer in the elastomeric polymer (a-1) is from 0.1 to 10% by weight, preferably 0.5 to 8% by weight, more preferably 0.7 to 5% by weight. If the content of the polyfunctional monomer is less than 0.1% by weight, the solvent resistance of films lowers, and if the content is more than 10% by weight, the elongation and impact resistance of films lower.

Examples of the other copolymerizable vinyl monomer used in the elastomeric polymer (a-1) are, for instance, an alkyl methacrylate having a $C_1$ to $C_{12}$ alkyl group such as methyl methacrylate, ethyl methacrylate, propyl methacrylate or butyl methacrylate, a hydroxyalkyl (meth)acrylate such as hydroxyethyl (meth)acrylate, glycidyl (meth)acrylate, an unsaturated carboxylic acid such as acrylic acid, methacrylic acid or crotonic acid, an aromatic vinyl compound such as styrene, α-methylstyrene, o-, m- or p-methylstyrene or chlorostyrene, a vinyl cyanide compound such as acrylonitrile or methacrylonitrile, a halogenated vinyl compound such as vinyl chloride or vinylidene chloride, and the like. Alkyl methacrylates are preferable. The content of the other vinyl monomer in the elastomeric polymer (a-1) is from 0 to 49.9% by weight, preferably 5 to 45% by weight.

The elastomeric polymer (a-1) may have a single layer structure or a multi-layer structure so long as the proportions of monomers of the elastomeric polymer as a whole fall within the above ranges.

As the alkyl methacrylate used in the graft component (a-2) are preferred alkyl methacrylates having a $C_1$ to $C_4$ alkyl group, e.g., methyl methacrylate, ethyl methacrylate, propyl methacrylate and butyl methacrylate. The alkyl methacrylates may be used alone or in admixture thereof. The alkyl group of the alkyl methacrylate may be linear or may be branched, but if the number of carbon atoms thereof exceeds 4, the reaction rate becomes slow. The content of the alkyl methacryalte in the graft component (a-2) is at least 50% by weight, preferably at least 60% by weight, more preferably at least 70% by weight. If the content of the alkyl methacrylate is less than 50% by weight, the solvent resistance and transparency of films deteriorate.

The alkyl methacrylate may be used in combination with other vinyl monomers copolymerizable therewith. Examples of the other vinyl monomers are, for instance, an alkyl acrylate having a $C_1$ to $C_{12}$ alkyl group such as methyl acrylate, ethyl acrylate, propyl acrylate or butyl acrylate, a hydroxyalkyl (meth)acrylate such as hydroxyethyl (meth) acrylate, glycidyl (meth)acrylate, an unsaturated carboxylic acid such as acrylic acid, methacrylic acid or crotonic acid, an aromatic vinyl compound such as styrene, α-methylstyrene, o-, m- or p-methylstyrene or chlorostyrene, a vinyl cyanide compound such as acrylonitrile or methacrylonitrile, a halogenated vinyl compound such as vinyl chloride or vinylidene chloride, and the like. Alkyl acrylates are preferable.

The graft component (a-2) which has been graft-polymerized onto the elastomeric polymer (a-1) may be in the form of a single layer or a multi-layer so long as the proportions of monomers of the graft component as a whole fall within the above ranges.

The proportions of elstomeric polymer (a-1) and graft component (a-2) used in the acrylic resin (A) are, based on 100 parts by weight of the total of (a-1) and (a-2), from 5 to 85 parts by weight for the former and from 95 to 15 parts by weight for the latter, preferably from 10 to 80 parts by weight for the former and from 90 to 20 parts by weight for the latter, more preferably from 20 to 65 parts by weight for the former and from 80 to 35 parts by weight for the latter. If the amount of the elastomeric polymer (a-1) is less than 5 parts by weight, the impact resistance of films deteriorates, and if the amount of the elastomeric polymer (a-1) is more than 85 parts by weight, the elongation and transparency of films deteriorate.

The particle size of the elastomeric polymer (a-1) is from 50 to 400 nm, preferably 100 to 350 nm, more preferably 150 to 300 nm. If the particle size is less than 50 nm, the impact resistance of films deteriorates, and if it is more than 400 nm, the flex whitening resistance and surface property of films deteriorate.

The method for preparing the acrylic resin (A) used in the present invention is not particularly limited and, for instance, suspension polymerization method and emulsion polymerization method are adoptable. It is preferably to conduct the preparation by emulsion polymerization method using monomers such as alkyl acrylate, alkyl methacrylate and polyfunctional monomer which are copolymerizable with these monomers and have at least two non-conjugated double bonds per a molecule. For example, according to an emulsion polymerization method, elastomeric polymer (a-1) is firstly prepared and graft component (a-2) is then prepared in the same reaction system. The emulsion polymerization can be conducted in a usual manner.

In the above-mentioned emulsion polymerization method, usual polymerization initiators, particularly polymerization initiators capable of generating a free radical, are used. Examples of such polymerization initiators are, for instance, an inorganic peroxide such as potassium persulfate or sodium persulfate, an organic peroxide such as cumene hydroperoxide or benzoyl peroxide, and the like. Further, oil-soluble initiators such as azobisisobutyronitrile can be used. These may be used alone or in admixture thereof.

These polymerization initiators may be used, as a usual redox initiator, in combination with a reducing agent such as sodium sulfite, sodium thiosulfate, sodium formaldehyde sulfoxylate, ascorbic acid or ferrous sulfate.

Surface active agents used in the emulsion polymerization are not particularly limited, and any of surface active agents used for usual emulsion polymerization can be used. Examples thereof are, for instance, an anionic surface active agent such as a sodium alkyl sulfate, a sodium alkylbenzene sulfonate or sodium laurate, and a non-ionic surface active agent such as a reaction product of an alkyl phenol and ethylene oxide. The surface active agents may be used alone or in admixture thereof. Further, a cationic surface active agent such as an alkylamine hydrochloride may be used as occasion demands.

From a polymer latex obtained by such copolymerization, a resin is separated and recovered by conducting usual coagulation (for example, coagulation using a salt), washing with water, dehydration and drying, or by treatment such as spray drying or freeze drying.

In the present invention, crosslinked acrylic polymer (B) is incorporated as a matting agent into the acrylic resin (A). As the crosslinked acrylic polymer (B) is used a crosslinked copolymer of an alkyl acrylate and an allyl methacrylate, or a graft copolymer obtained by polymerizing a monomer component containing 60 to 100% by weight of an alkyl methacrylate in the presence of the crosslinked copolymer mentioned above.

The crosslinked acrylic polymer (B) used as a matting agent in the present invention is preferably a copolymer comprising (b-1) 40 to 100 parts by weight, preferably 50 to 90 parts by weight, of a crosslinked acrylic ester copolymer having a single or multi layer structure prepared by polymerizing in one or more stages a monomer mixture consisting of an acrylic monomer composed of 40 to 90% by weight, preferably 50 to 85% by weight, more preferably 60 to 80% by weight, of an alkyl acrylate and 60 to 10% by weight, preferably 50 to 15% by weight, more preferably 40 to 20% by weight, of an alkyl methacrylate, 0 to 10% by weight of at least one other vinyl monomer copolymerizable with the acrylic monomer (based on the total of the acrylic polymer and the other vinyl monomer), and 0.1 to 20 parts by weight, preferably 0.5 to 10 parts by weight, of a polyfunctional monomer having at least two non-conjugated double bonds per a molecule and copolymerizable with the above-mentioned monomers based on 100 parts by weight of the total of the acrylic monomer and the other vinyl monomer, and (b-2) 60 to 0 part by weight, preferably 50 to 10 parts by weight, of a graft component having a single or multi-layer structure and composed of 60 to 100% by weight, preferably at least 70% by weight, of an alkyl methacrylate, 0 to 40% by weight, preferably at most 30% by weight, of an alkyl acrylate and 0 to 10% by weight, preferably 0 to 5% by weight, of other vinyl monomer copolymerizable therewith which have been graft-copolymerized onto the crosslinked acrylic ester polymer (b-1).

It is preferable that the crosslinked acrylic copolymer (B) has a weight average particle size of 0.5 to 15 μm, preferably 1 to 10 μm. If the weight average particle size of the crosslinked acrylic copolymer (B) is less than 0.5 μm, the matting effect lowers, and if it is more than 15 μm, the impact resistance or the flex whitening resistance lowers.

If the amount of the alkyl acrylate in the acrylic monomer used in the crosslinked acrylic ester polymer (b-1) is less than 40% by weight, the impact resistance deteriorates, and if it is more than 90% by weight, the flex whitening resistance and transparency deteriorate. As the alkyl acrylate and alkyl methacrylate used in the crosslinked acrylic ester polymer (b-1) are exemplified those used for the acrylic resin (A). These may be used alone or in admixture thereof.

The acrylic monomer may be used in combination with other vinyl monomers copolymerizable therewith. Examples of the copolymerizable other vinyl monomers are, for instance, an aromatic vinyl compound such as styrene, α-methylstyrene, o-, m- or p-methylstyrene or chlorostyrene, a vinyl cyanide compound such as acrylonitrile or methacrylonitrile, an unsaturated carboxylic acid such as acrylic acid, methacrylic acid or crotonic acid, a halogenated vinyl compound such as vinyl chloride or vinylidene chloride, and the like. These may be used alone or in admixture thereof.

As the polyfunctional monomer having at least two non-conjugated double bonds per a molecule used in the crosslinked acrylic ester polymer (b-1) are exemplified those used for the acrylic resin (A). These may be used alone or in admixture thereof. If the amount of the polyfunctional monomer is less than 0.1 part by weight, the matting effect lowers, and if it is more than 20 parts by weight, the impact resistance of films lowers.

The crosslinked acrylic ester polymer (b-1) may be used as a matting agent as it is, or may be further subjected to graft polymerization wherein a monomer component containing 60 to 100% by weight of an alkyl methacrylate is graft-polymerized onto the polymer (b-1) in one or more stages. If the amount of the crosslinked acrylic ester polymer (b-1) is less than 40 parts by weight per 100 parts by weight of the total of the polymer (b-1) and the graft component (b-2), the matting effect decreases.

If the content of the alkyl methacrylate in the monomer component (b-2) to be graft-polymerized onto the crosslinked acrylic ester polymer (b-1) is less than 60% by weight, the solvent resistance or the processability deteriorates. As the alkyl acrylate and alkyl methacrylate used in the monomer component (b-2) to be graft-polymerized onto the crosslinked acrylic ester polymer (b-1) are exemplified those used for the acrylic resin (A). These may be used alone or in admixture thereof.

Examples of the copolymerizable other vinyl monomers used in the graft component (b-2) are, for instance, an aromatic vinyl compound such as styrene, α-methylstyrene, o-, m- or p-methylstyrene or chlorostyrene, a vinyl cyanide compound such as acrylonitrile or methacrylonitrile, an unsaturated carboxylic acid such as acrylic acid, methacrylic acid or crotonic acid, a halogenated vinyl compound such as vinyl chloride or vinylidene chloride, and the like. These may be used alone or in admixture thereof.

The method for preparing the crosslinked acrylic polymer (B) for matting is not particularly limited, and it is prepared, for example, by suspension polymerization method, emulsion polymerization method or the like. From the viewpoint of obtaining the crosslinked acrylic polymer (B) having a weight average particle size of 0.5 to 15 µm, it is preferable to prepare it by suspension polymerization, using an alkyl acrylate, an alkyl methacrylate, a polyfunctional monomer and optionally other ethylenically unsaturated monomers. From a polymer slurry obtained by such copolymerization, the polymer (B) is separated and recovered by usual operations such as washing with water, dehydration, drying and the like.

Thermoplastic resin composition (I) of the present invention is prepared by incorporating the crosslinked acrylic polymer (B) for matting into the acrylic resin (A). The crosslinked acrylic polymer (B) is used in an amount of 0.5 to 20 parts by weight, preferably 1 to 15 parts by weight, more preferably 2 to 10 parts by weight, based on 100 parts by weight of the acrylic resin (A). If the amount of the polymer (B) is less than 0.5 part by weight, the matting property is low, and if it is more than 20 parts by weight, the processability, surface property or flex whitening resistance of films deteriorates.

The preparation of the thermoplastic resin composition (I) is carried out in a usual manner. For example, the preparation is carried out by such a method as mixing the components (A) and (B) by a mixer such as a Henschel mixer, and melt-kneading the resulting mixture by an extruder, a roll mill or the like.

The thermoplastic resin composition (I) of the present invention is useful particularly for films. For example, films which have a good processability of high stretching and excellent impact resistance, transparency, weatherability, solvent resistance and flex whitening resistance and are improved in printing defect, are obtained by a usual melt extrusion method such as inflation method or T-die extrusion method, a calendering method, a solution casting method, or the like. It is appropriate that the thickness of the films is from 10 to 300 µm, and a thickness of 15 to 200 µm is preferable.

The resin composition of the present invention may one or more of usual additives, such as inorganic or organic pigment or dye for pigmentation, antioxidant to enhance the stability to heat and light, ultraviolet absorber, light stabilizer and the like.

In the present invention, formation of the thermoplastic resin composition (I) into films is carried out in such a manner that, when applying a high stretching processing to a film, the both surfaces of the film are simultaneously brought into contact with rolls having different temperatures during the time when the film temperature is not less than Tg of the thermoplastic resin (I), that is, one surface of the film is brought into contact with a roll having a temperature of not less than Tg, preferably not less than Tg+10° C., and the other surface of the film is brought into contact with a roll having a temperature of less than Tg, preferably Tg–10° C., whereby matt acrylic films having an excellent printability are obtained. If the temperature of the roll contacted with the surface to be made smooth is less than Tg, the effect of making the film surface smooth is insufficient. If the temperature of the roll contacted with the surface to be delustered is more than Tg, the effect of delustering the film surface is not obtained. The temperature of the film when pressed by rolls is not less than Tg, preferably not less than Tg+10° C., more preferably not less than Tg+20° C., the most preferably not less than Tg+30° C. If the film temperature is less than Tg, the effect of making the film surface smooth is insufficient. It is preferable that the film temperature is not more than Tg+100° C., since the influence of heat becomes too large if the temperature is too high. The material of the rolls are not particularly limited and includes, for instance, metals and rubbers.

In order to prevent the printing defect from occurring as much as possible by decreasing protrusions on the film surface, it is desired, for example, that the number of protrusions such as fish eye on the film surface is at most 5 per m$^2$, preferably at most 3 per m$^2$, more preferably at most 2 per m$^2$ and the most preferably at most 1 per m$^2$.

The present invention is more specifically explained by means of the following examples and comparative examples in which all parts and % are by weight unless otherwise noted. It is to be understood that the present invention is not limited to these examples.

In the examples and comparative examples, measurement and evaluation were made according to the following conditions and methods.

(1) Glass Transition Temperature (Tg)

Tg was measured according to JIS K 7121 by using a differential scanning calorimeter (DSC) made by Seiko Denshi Kogyo Kabushiki Kaisha.

(2) Melt Index

The measurement was made at 230° C. under a load of 5 kg.

(3) Impact Resistance

A 50 µm thick film was laminated onto a polycarbonate sheet (thickness 0.8 mm), and a falling ball impact test of the laminate was made at −20° C. according to JIS K 5400. The energy was calculated by the equation: (50% failure height)×(weight of ball). The unit is J joule).

(4) Gloss

Using a gloss meter made by Nippon Denshoku Kogyo Kabushiki Kaisha, 60° light reflectance of the film surface contacted with a lower temperature roll was measured at 23° C. according to JIS Z 8741. The unit is %.

Further, in order to evaluate the change in gloss (change in degree of matting) by heat treatment, a sample film having a size of 100 mm×100 mm was fixed by an aluminum frame, kept in an oven at 200° C. for 60 seconds and cooled, and the reflectance (gloss) (%) after heating at 200° C. for 1 minute was measured by the gloss meter mentioned above according to JIS Z 8741.

(5) Solvent Resistance

A 50 μm thick film was cut into a strip having a width of 10 mm and a length of 100 mm, and was immersed in toluene with suspending a 2.3 g weight to the strip. The time until the strip was broken was measured. The unit is second.

(6) Flex Whitening Resistance

A 50 μm thick film was folded up 180°, and the whitening resistance was evaluated according to the following criteria.
○: No whitening is observed at the fold.
Δ: The fold is slightly whitened.
X: Whitening is observed at the fold.

(7) Processability

A resin composition was extruded by a T-die extrusion method into a film having a thickness of 50 μm, and the processability was evaluated according to the following criteria.
○: Composition can be stably extruded to a film having a uniform thickness without breaking of the film.
Δ: Breaking of film does not occur, but the film thickness is slightly uneven and stable extrusion cannot be conducted.
X: Breaking of film occurs, and the extrusion is unstable.

(8) Printing Defect

Gravure printing was applied to the mirror surface of a film, and printed film having a width of 1 m and a length of about 10 m was visually checked to count the number of non-printed spots. The number of non-printed spots per 1 m² is shown.

(9) Ink Receptivity

Gravure printing was applied to the mirror surface of a film, and the ink receptivity was visually evaluated with respect to printed film having a width of 1 m and a length of 1 m according to the following criteria.
○: Print is sharp.
Δ: Print is slightly unclear.
X: Print is unclear.

(10) Surface Property

The surface appearance of a film was visually observed and evaluated according to the following criteria.
○: Burning and foreign matter are scarcely observed.
Δ: Burning and foreign matter are slightly observed.
X: Either burning or foreign matter is observed, and the surface is uneven.

The abbreviations described hereinafter denote the following compounds.
OSA: Sodium dioctyl sulfosuccinate
BA: Butyl acrylate
MMA: Methyl methacrylate
ST: Styrene
CHP: Cumene hydroperoxide
AMA: Allyl methacrylate
tDM: Tertiary-dodecylmercaptan
BDMA: 1,4-Butylene glycol dimethacrylate
BPO: Benzoyl peroxide

EXAMPLES 1 TO 8 AND COMPARATIVE EXAMPLES 1 TO 3

(1) Preparation of Acrylic Resin (A) (A-1 to A-4)

An 8 liter polymerization reactor equipped with a stirrer, a thermometer, a nitrogen gas feeding tube, a monomer feeding tube and a reflux condenser was charged with the following materials, and sodium dioctyl sulfosuccinate (OSA) in an amount shown in Table 1.

| Water | 200 parts |
| Sodium formaldehyde sulfoxylate | 0.15 part |
| Ferrous sulfate dihyrate | 0.0015 part |
| Disodium ethylenediaminetetraacetate | 0.006 part |

After purging the reactor with nitrogen gas, the inner temperature was elevated to 60° C., and a mixture (1) shown in Table 1 was continuously added to the reactor at a rate of 15 parts/hour to conduct polymerization. After the completion of the addition, the polymerization was further continued for 1 hour to give an elastomeric polymer (a-1) in a polymerization conversion of at least 98%.

In the presence of the elastomeric polymer (a-1), a monomer mixture (2) shown in Table 1 was then polymerized as a graft component (a-2) by continuously adding it to the reactor at a rate of 10 parts/hour. The polymerization was further continued for 1 hour to raise the polymerization conversion to 98% or more, thus giving a latex of an acrylic resin (A).

The obtained latex was salted out with calcium chloride, washed with water and dried to give a dry powder of acrylic resin (A).

TABLE 1

| Acrylic resin (A) | A-1 | A-2 | A-3 | A-4 |
|---|---|---|---|---|
| OSA (part) | 0.25 | 0.05 | 0.005 | 0.001 |
| Mixture (1) (part) | 30 | 35 | 15 | 4 |
| (elastomeric polymer a-1) | | | | |
| MMA (%) | 10 | 5 | 20 | 70 |
| BA (%) | 90 | 95 | 80 | 30 |
| AMA (part) | 0.40 | 0.30 | 0.05 | 0.001 |
| CHP (part) | 0.02 | 0.03 | 0.02 | 0.005 |
| Mixture (2) (part) | 70 | 65 | 85 | 96 |
| (graft component a-2) | | | | |
| MMA (%) | 90 | 85 | 30 | 60 |
| BA (%) | 10 | 15 | 70 | 40 |
| tDM (part) | 0.20 | 0.15 | — | 0.25 |
| CHP (part) | 0.30 | 0.35 | 0.40 | 0.22 |
| Weight average particle size (nm) of elastomeric polymer (a-1) | 85 | 300 | 600 | 120 |

(2) Preparation of Crosslinked Acrylic Polymer (B) Used for Matting (B-1 to B-5)

An 8 liter polymerization reactor equipped with a stirrer, a thermometer, a nitrogen gas feeding tube, a monomer feeding tube and a reflux condenser was charged with the following materials.

| Water | 200 parts |
| Sodium lauryl sulfate | 0.05 part |
| Sodium polyacrylate | 0.55 part |
| Sodium sulfate | 1.6 parts |

After purging the reactor with nitrogen gas, the inner temperature was elevated to 60° C., and a mixture (1) shown in Table 2 was added to the reactor. The polymerization was conducted up to a polymerization conversion of at least 98% to give a crosslinked acrylic ester polymer (b-1).

In the presence of the crosslinked acrylic ester polymer (b-1), a monomer mixture (2) shown in Table 2 was then polymerized as a graft component (b-2) by continuously adding it to the reactor at a rate of 15 parts/hour. After the completion of the addition, the polymerization was further continued up to a polymerization conversion to 98% or more to give a slurry of a crosslinked acrylic polymer (B) used for matting.

The obtained slurry was washed with water, dehydrated and dried to give a dry powder of crosslinked acrylic polymer (B).

The pellets were extruded by an extruder having a T-die, and the extruded film was brought into contact with rolls kept at temperatures shown in Table 3 when the film temperature had reached 170° C. The properties of the film were measured and evaluated.

The results are shown in Table 3.

TABLE 3

| | Example | | | | | | | | Com. Ex. | | |
|---|---|---|---|---|---|---|---|---|---|---|---|
| | 1 | 2 | 3 | 4 | 5 | 6 | 7 | 8 | 1 | 2 | 3 |
| Acrylic resin (A) (part by wt.) | | | | | | | | | | | |
| A-1 | 100 | — | 100 | 100 | — | 100 | 100 | — | — | — | 100 |
| A-2 | — | 100 | — | — | 100 | — | — | — | 100 | — | — |
| A-3 | — | — | — | — | — | — | — | 100 | — | — | — |
| A-4 | — | — | — | — | — | — | — | — | — | 100 | — |
| Crosslinked acrylic polymer (B) (part by wt.) | | | | | | | | | | | |
| B-1 | 6 | 10 | — | — | — | — | — | — | 55 | — | 10 |
| B-2 | — | — | 6 | — | 8 | — | — | — | — | — | — |
| B-3 | — | — | — | 10 | — | — | — | — | — | 10 | — |
| B-4 | — | — | — | — | — | 6 | — | 15 | — | — | — |
| B-5 | — | — | — | — | — | — | 10 | — | — | — | — |
| Grass transition temperature of resin composition (° C.) | 92 | 85 | 88 | 82 | 86 | 84 | 78 | 65 | 95 | 102 | 85 |
| Temperature of one roll (° C.) | 100 | 90 | 100 | 90 | 90 | 90 | 90 | 75 | 100 | 40 | 100 |
| Temperature of the other roll (° C.) | 60 | 40 | 50 | 60 | 50 | 50 | 50 | 40 | 40 | 40 | 100 |
| Melt index of resin composition | 7.5 | 6.0 | 5.5 | 4.0 | 5.2 | 8.0 | 6.9 | 5.4 | 2.0 | 4.4 | 6.0 |
| Impact resistance | 11.1 | 9.8 | 8.6 | 15.3 | 9.4 | 2.5 | 3.2 | 2.1 | 1.8 | 0.2 | 9.8 |
| Gloss | 25 | 20 | 27 | 20 | 24 | 35 | 55 | 15 | 18 | 18 | 80 |
| Gloss after heating at 200° C. for 1 min. | 30 | 23 | 30 | 24 | 28 | 40 | 60 | 19 | 23 | 20 | 60 |
| Solvent resistance | 40 | 45 | 38 | 32 | 33 | 45 | 15 | 31 | 39 | 28 | 45 |
| Flex whitening resistance | o | o | o | o | o | Δ | Δ | Δ | x | o | o |
| Processability | o | o | o | o | o | o | Δ | Δ | x | o | o |
| Printing defect | 0 | 0 | 0.1 | 0.2 | 0 | 0.1 | 5.8 | 0.5 | 0.6 | 0.2 | 0 |
| Ink receptivity | o | o | o | o | o | o | o | o | o | x | o |
| Surface property | o | o | o | o | o | o | Δ | Δ | x | o | o |

TABLE 2

| | Crosslinked acrylic polymer (B) | | | | |
|---|---|---|---|---|---|
| | B-1 | B-2 | B-3 | B-4 | B-5 |
| Mixture (1) (part) (crosslinked acrylic ester polymer b-1) | 60 | 85 | 100 | 30 | 65 |
| MMA (%) | 30 | 15 | 10 | 5 | 9 |
| BA (%) | 70 | 85 | 90 | 95 | 91 |
| BDMA (part) | 0.70 | 2.00 | 0.45 | 0.55 | 0.05 |
| BPO (part) | 0.02 | 0.04 | 0.02 | 0.01 | 0.04 |
| Mixture (2) (part) (graft component b-2) | 40 | 15 | — | 70 | 35 |
| MMA (%) | 90 | 95 | — | 70 | 55 |
| BA (%) | 10 | 5 | — | 30 | 45 |
| BPO (part) | 0.03 | 0.02 | — | 0.05 | 0.03 |
| Weight average particle size (μm) of crosslinked acrylic polymer (B) | 5 | 3 | 6 | 8 | 20 |

(3) Preparation of Thermoplastic Resin Composition (I)

Acrylic resin (A) and crosslinked acrylic polymer (B), which were shown in Table 3, were mixed by a Henschel mixer. The resulting mixture was extruded at 190° C. by a vent-type extruder to pelletize, and the pellets were used for measurement and evaluation of properties. The residual monomer content of the pellets was not more than 500 ppm.

INDUSTRIAL APPLICABILITY

The acrylic matt thermoplastic resin film of the present invention has excellent properties such as flex whitening resistance, impact resistance and solvent resistance, and also has excellent surface property and good printability because of decreased number of protrusions such as fish eyes on the film surface and, moreover, can be secondarily processed with maintaining the matted state.

The invention claimed is:

1. An acrylic matt thermoplastic resin film having a mirror surface on one side and a matt surface on the other side, and comprising an acrylic resin (A) and 0.5 to 20 parts by weight of a crosslinked acrylic polymer (B) as a matting agent based on 100 parts by weight of said acrylic resin (A).

2. The film of claim 1, wherein said film has a thickness of 10 to 300 μm.

3. The film of claim 1, wherein said acrylic resin (A) is an acrylic graft copolymer comprising (a-1) 5 to 85 parts by weight of an elastomeric polymer composed of 50 to 99.9% by weight of an alkyl acrylate, 0 to 49.9% by weight of other copolymerizable vinyl monomer and 0.1 to 10% by weight of a copolymerizable polyfunctional monomer having at least two non-conjugated double bonds per a molecule, and (a-2) 95 to 15 parts by weight of a graft component composed of 50 to 100% by weight of an alkyl methacrylate and 0 to 50 % by weight of other vinyl monomer copolymerizable therewith which have been graft-polymerized onto said elastomeric polymer (a-1), in which said elastomeric polymer (a-1) has a particle size of 50 to 400 nm.

4. The film of claim 1, wherein said crosslinked acrylic polymer (B) is a copolymer comprising (b-1) 40 to 100 parts by weight of a crosslinked acrylic ester polymer prepared by an polymerizing 100 to 90% by weight of an acrylic monomer composed of 40 to 90% by weight of an alkyl acrylate and 60 to 10% by weight of an alkyl methacrylate with 0 to 10% by weight of at least one other copolymerizable vinyl monomer and 0.1 to 20 parts by weight of a copolymerizable polyfunctional monomer having at least two non-conjugated double bonds per a molecule based on 100 parts by weight of the total of said acrylic monomer and said other vinyl monomer, and (b-2) 60 to 0 part by weight of a graft component composed of 60 to 100% by weight of an alkyl methacrylate, 0 to 40% by weight of an alkyl acrylate and 0 to 10% by weight of other copolymerizable vinyl monomer which have been graft-polymerized onto said crosslinked acrylic ester polymer (b-1).

5. The film of claim 1, wherein said mirror surface has a print.

6. The film of claim 1, wherein said film has a thickness of 10 to 300 μm, and said acrylic resin (A) is an acrylic graft copolymer comprising (a-1) 5 to 85 parts by weight of an elastomeric polymer composed of 50 to 99.9% by weight of an alkyl acrylate, 0 to 49.9% by weight of other copolymerizable vinyl monomer and 0.1 to 10% by weight of a copolymerizable polyfunctional monomer having at least two non-conjugated double bonds per a molecule, and (a-2) 95 to 15 parts by weight of a graft component composed of 50 to 100% by weight of an alkyl methacrylate and 0 to 50% by weight of other vinyl monomer copolymerizable therewith which have been graft-polymerized onto said elastomeric polymer (a-1), in which said elastomeric polymer (a-1) has a particle size of 50 to 400 nm.

7. The film of claim 1, wherein said film has a thickness of 10 to 300 μm, and said crosslinked acrylic polymer (B) is a copolymer comprising (b-1) 40 to 100 parts by weight of a crosslinked acrylic ester polymer prepared by polymerizing 100 to 90% by weight of an acrylic monomer composed of 40 to 90% by weight of an alkyl acrylate and 60 to 10 % by weight of an alkyl methacrylate with 0 to 10% by weight of at least one other copolymerizable vinyl monomer and 0.1 to 20 parts by weight of a copolymerizable polyfunctional monomer having at least two nonconjugated double bonds per a molecule based on 100 parts by weight of the total of said acrylic monomer and said other vinyl monomer, and (b-2) 60 to 0 part by weight of a graft component composed of 60 to 100% by weight of an alkyl methacrylate, 0 to 40% by weight of an alkyl acrylate and 0 to 10% by weight of other copolymerizable vinyl monomer which have been graft-polymerized onto said crosslinked acrylic ester polymer (b-1).

8. The film of claim 5, wherein said acrylic resin (A) is an acrylic graft copolymer comprising (a-1) 5 to 85 parts by weight of an elastomeric polymer composed of 50 to 99.9% by weight of an alkyl acrylate, 0 to 49.9% by weight of other copolymerizable vinyl monomer and 0.1 to 10% by weight of a copolymerizable polyfunctional monomer having at least two non-conjugated double bonds per a molecule, and (a-2) 95 to 15 parts by weight of a graft component composed of 50 to 100% by weight of an alkyl methacrylate and 0 to 50% by weight of other vinyl monomer copolymerizable therewith which have been graft-polymerized onto said elastomeric polymer (a-1), in which said elastomeric polymer (a-1) has a particle size of 50 to 400 nm, and said crosslinked acrylic polymer (B) is a copolymer comprising (b-1) 40 to 100 parts by weight of a crosslinked acrylic ester polymer prepared by polymerizing 100 to 90% by weight of an acrylic monomer composed of 40 to 90% by weight of an alkyl acrylate and 60 to 10% by weight of an alkyl methacrylate with 0 to 10% by weight of at least one other copolymerizable vinyl monomer and 0.1 to 20 parts by weight of a copolymerizable polyfunctional monomer having at least two non-conjugated double bonds per a molecule based on 100 parts by weight of the total of said acrylic monomer and said other vinyl monomer, and (b-2) 60 to 0 part by weight of a graft component composed of 60 to 100% by weight of an alkyl methacrylate, 0 to 40% by weight of an alkyl acrylate and 0 to 10% by weight of other copolymerizable vinyl monomer which have been graft-polymerized onto said crosslinked acrylic ester polymer (b-1).

9. The film of claim 1, wherein said film has a thickness of 10 to 300 μm, said acrylic resin (A) is an acrylic graft copolymer comprising (a-1) 5 to 85 parts by weight of an elastomeric polymer composed of 50 to 99.9% by weight of an alkyl acrylate, 0 to 49.9% by weight of other copolymerizable vinyl monomer and 0.1 to 10% by weight of a copolymerizable polyfunctional monomer having at least two non-conjugated double bonds per a molecule, and (a-2) 95 to 15 parts by weight of a graft component composed of 50 to 100% by weight of an alkyl methacrylate and 0 to 50% by weight of other vinyl monomer copolymerizable therewith which have been graft-polymerized onto said elastomeric polymer (a-1), in which said elastomeric polymer (a-1) has a particle size of 50 to 400 nm, and said crosslinked acrylic polymer (B) is a copolymer comprising (b-1) 40 to 100 parts by weight of a crosslinked acrylic ester polymer prepared by polymerizing 100 to 90% by weight of an acrylic monomer composed of 40 to 90% by weight of an alkyl acrylate and 60 to 10% by weight of an alkyl methacrylate with 0 to 10% by weight of at least one other copolymerizable vinyl monomer and 0.1 to 20 parts by weight of a copolymerizable polyfunctional monomer having at least two non-conjugated double bonds per a molecule based on 100 parts by weight of the total of said acrylic monomer and said other vinyl monomer, and (b-2) 60 to 0 part by weight of a graft component composed of 60 to 100% by weight of an alkyl methacrylate, 0 to 40% by weight of an alkyl acrylate and 0 to 10% by weight of other copolymerizable vinyl monomer which have been graft-polymerized onto said crosslinked acrylic ester polymer (b-1).

10. The film of claim 2, which has a print on the mirror surface.

11. The film of claim 3, which has a print on the mirror surface.

12. The film of claim 4, which has a print on the mirror surface.

13. The film of claim 6, which has a print on the mirror surface.

14. The film of claim 7, which has a print on the mirror surface.

15. The film of claim 8, which has a print on the mirror surface.

16. The film of claim 9, which has a print on the mirror surface.

* * * * *